United States Patent
Wolfgram et al.

(10) Patent No.: US 6,840,429 B2
(45) Date of Patent: Jan. 11, 2005

(54) METHOD OF AND COMPOSITION FOR TREATING A NON-METALLIC REFRACTORY MATERIAL FOR BRAZING

(75) Inventors: Lawrence A. Wolfgram, Waukesha, WI (US); Nitin R. Shah, Oak Creek, WI (US)

(73) Assignee: Lucas-Milhaupt, Inc., Cudahy, WI (US)

( * ) Notice: Subject to any disclaimer, the term of this patent is extended or adjusted under 35 U.S.C. 154(b) by 99 days.

(21) Appl. No.: 10/253,382

(22) Filed: Sep. 24, 2002

(65) Prior Publication Data

US 2004/0112945 A1 Jun. 17, 2004

Related U.S. Application Data

(60) Provisional application No. 60/324,857, filed on Sep. 25, 2001.

(51) Int. Cl.⁷ .......................... B23K 31/02; B23K 35/12
(52) U.S. Cl. .................... 228/124.5; 208/226; 208/230; 208/251
(58) Field of Search .......................... 228/122.1, 124.5, 228/208, 210, 225, 226, 227, 230, 232, 245, 249, 251

(56) References Cited

U.S. PATENT DOCUMENTS

| | | | | |
|---|---|---|---|---|
| 2,570,248 A | * | 10/1951 | Kelley | 228/121 |
| 2,857,663 A | * | 10/1958 | Beggs | 228/122.1 |
| 2,996,401 A | * | 8/1961 | Welch et al. | 427/106 |
| 3,063,144 A | * | 11/1962 | Palmour, III | 228/124.1 |
| 3,620,799 A | * | 11/1971 | Hoelscher et al. | 427/373 |
| 4,291,815 A | * | 9/1981 | Gordon et al. | 220/200 |
| 4,356,047 A | * | 10/1982 | Gordon et al. | 427/123 |
| 4,621,761 A | * | 11/1986 | Hammond et al. | 228/124.1 |
| 4,729,504 A | * | 3/1988 | Edamura | 228/122.1 |
| 4,859,531 A | * | 8/1989 | Tsuji et al. | 428/333 |
| 4,917,642 A | * | 4/1990 | Nakahashi et al. | 445/44 |
| 5,056,702 A | * | 10/1991 | Nakahashi et al. | 228/123.1 |
| 5,340,012 A | | 8/1994 | Beeferman et al. | |
| 5,695,861 A | | 12/1997 | Bloom | |
| 6,528,123 B1 | * | 3/2003 | Cadden et al. | 427/404 |

OTHER PUBLICATIONS

Chemical Abstracts, vol. 110, No. 2 abstract No. 12448e, Joining of ceramic materials by brazing (Jan. 1989).
A. Wu, et al., Heat–resistant joints of $Si_3N_4$ ceramics with intermetallic compounds formed in situ, Journal of Materials Science, v. 36, pp. 2673–2678 (Jun. 2001).
European Patent Office, Communication & Search Report re EP Application 02 256 658 (Oct. 20, 2003).

* cited by examiner

Primary Examiner—Stanley S. Silverman
Assistant Examiner—Colleen P. Cooke
(74) Attorney, Agent, or Firm—Law Office of Leo Zucker

(57) ABSTRACT

A coating composition and its use in a metallization process that facilitates bonding of brazing filler metals to treated refractory surfaces, such as ceramics. The coating can be applied in preselected areas of the refractory surface to define a target area for brazing. In one embodiment, the coating composition is applied to a refractory material prior to brazing, the composition including (i) a group IVB transition metal component selected from the group consisting of a group IVB transition metal, a hydride thereof, and mixtures of group IVB metals and/or hydrides thereof, (ii) a binder material, and (iii) a fluid carrier, disclosed embodiments, the group IVB transition metal component is titanium, and the binder material is a combination of a styrene block copolymer and a hydrocarbon resin.

17 Claims, No Drawings

METHOD OF AND COMPOSITION FOR TREATING A NON-METALLIC REFRACTORY MATERIAL FOR BRAZING

CROSS REFERENCE TO RELATED APPLICATION

Pursuant to 35 U.S. C. § 119(e), this application claims the benefit of U.S. Provisional Patent application No. 60/324,857, filed on Sep. 25, 2001.

BACKGROUND OF THE INVENTION

1. Field of the Invention

This invention relates to treatment of nonmetallic refractory materials so as to facilitate bonding of the materials to one other or to metallic components.

2. Discussion of the Known Art

Refractory materials such as ceramics are often used in applications that require joining of such materials to either other ceramics or to metal components. For example, in the automotive industry, ceramics are used for many parts including wear pads that are joined to metal parts to prolong the service life of the parts. In another example, technical ceramics are used in many electrical and electronic applications such as power grid tubes, vacuum interrupters, semi-conductor packaging, multilayer substrates, ball grid arrays, power dissipation packages, and sensor packages.

Refractory materials such as ceramics have in the past been difficult to join together or to metallic components. Conventionally, metallization processes had to be performed on a ceramic prior to joining it to another ceramic or to a metal body because existing brazing formulations do not adequately wet a refractory surface. Typically, these processes involve multiple steps that form a bridge between the surface of the refractory material and braze filler metals, solder metals, or conductive/protective metals used to construct circuits on the material.

One example of a conventional metallization process relating to ceramic as the refractory body involves four major steps:

1. applying the desired area of the refractory material which is to be metal lized (usually screened on) with a molybdenum or molybdenum/manganese paste, and then air drying or drying in an infrared oven (e.g. at about 90 deg. C. to about 100 deg C. for about 10 to about 15 minutes);
2. firing the product of step 1 above in a controlled atmosphere (e.g. wet hydrogen) kiln at about 1200° C. to about 1500° C.;
3. cleaning, etching and nickel plating either with an electroless or an electrolytic process the product of step 2 above, and re-firing to sinter nickel into the molybdenum/manganese coating; and
4. adding brazing filler metal in the form of a wire, foil, ring, preform or powdered metal in between the metallized sections of the refractory body or bodies and then heating or firing to a temperature above the liquidus of the brazing filler metal in an oxygen free environment such as argon, dry hydrogen, ammonia gas, or vacuum.

For electronic currents application, there can be additional steps of cleaning and activating the nickel layer and over plating with gold, silver, copper, or tin.

Another composition and method used with refractory materials is disclosed in U.S. Pat. No. 5,340,012, which is incorporated by reference herein. See also U.S. Pat. Nos. 3,063,144 (Nov. 13, 1962), and No 5,056,702 (Oct. 15, 1991).

SUMMARY OF THE INVENTION

The present invention relates to coating compositions and their use in a process that facilitates bonding of brazing filler metals to treated, non-metallic refractory surfaces such as ceramics. The coating can be applied in preselected areas of the refractory surface to define a target area for brazing. When compositions of the present invention are employed with brazing or soldering filler metals, strong bonds between non-metallic refractory bodies to non-metallic refractory bodies, and non-metallic refractory bodies to ferrous and non-ferrous metal materials, can be attained.

In one aspect, the present invention is a coating composition that is applied to a refractory material prior to brazing, the composition being comprised of a group IVB transition metal component selected from the group consisting of (i) a group IVB transition metal, a hydride thereof, mixtures of group IVB metals and/or hydrides thereof, (ii) a binder material, and (iii) a fluid carrier. For example, the group IVB transition metal component may be a group IVB transition metal selected from among titanium, zirconium, and hafnium, hydrides of these group IVB transition metals, and mixtures of these group members. In one embodiment, the group IVB transition metal component is titanium, titanium hydride, or mixtures thereof, and the binder material includes a styrene block copolymer and a hydrocarbon resin.

Suitable binder materials used in the present invention include, but are not limited to, hydrocarbon resins, modified hydrocarbon synthetic resins, gum rosins, tall oil rosins, wood rosins, modified rosin, acrylic polymer, natural and synthetic waxes, synthetic rubber like polyisobutylene, thermoplastic mixture of polybutylene and paraffin, water or solvent soluble cellulosic polymers, water soluble resins such as acrylic acid polymers, polyolefin and linear primary alcohols. Some gellant material like triblock, radial block and multiblock copolymers, optionally in conjunction with a diblock copolymer may also be employed. In one embodiment, the binder is a hydrocarbon resin. In another embodiment, it may be a hydrogenated hydrocarbon resin and styrene block copolymer.

The fluid carrier employed in the present invention may include, but is not limited to aliphatic hydrocarbon solvents, aromatic hydrocarbon solvents, alcohols, ketones, esters, glycol, glycol ether, glycerin, and water. The fluid carrier of choice will depend on its compatibility with the binder of choice. Paraffinic hydrocarbons and hydro treated Light petroleum distillate hydrocarbon solvents can be used herein.

In another embodiment, the coating composition includes about 10 to 90 weight percent of titanium or titanium hydride metal powder and 90 to 10 percent binder and fluid carrier including hydrogenated hydrocarbon resins (available from Hercules), styrene block copolymer, and treated light petroleum distillate hydrocarbon fluid carrier (available from Penreco).

The coating composition of the present invention may have an ink-like to paste-like consistency, and can be applied though a screen. The consistency of the composition can be varied to achieve the desired shape and fineness of details. For example, the composition can be applied to the entire refractory surface by suitable coating techniques including, but not limited to, brushing, rolling and/or spraying. In another example, In selective applications for rim sealing/ joining or in the formation of electrical/electronic circuit traces, a suitable mask can be used to control the coated treated areas.

Surface coating of ceramics with the inventive composition may allow more control of active metal concentration for interfacial compound development and, subsequently, joint strength. As a result, active metal depletion should be substantially reduced at ceramic surfaces and the deterioration of the braze material's physical properties attributable to excessive active metal concentrations (i.e. 8% or greater) should also be substantially reduced.

The present composition may also have such a consistency as to permit screen-printing or stenciling, followed by a metallization/brazing process with suitable brazing filler metals so as to form circuit traces on refractory substrates.

The composition of the present invention is suited for use with oxide ceramics like alumina, zirconia, silica, etc. In addition, most nitrides, carbides, diamonds (synthetic or natural), graphite or carbon, and sapphire (or similar gemstones) can be joined without the need for prior metallizing procedures.

After drying a refractory material on which the coating composition of the present invention has been applied, the coated treated surface can be metallized with any suitable brazing filler metal, employing conventional brazing/soldering processes and conventional equipment. For example, the coated treated surface can be heated in a substantially oxygen-free environment (e.g. argon, dry hydrogen and/or vacuum) to a temperature above the liquidus of the brazing filler metal or solder metal. The coating composition and process of the present invention can be used with commercially available brazing filler metals and in commercially available heating equipment.

For example, the following process can be used where a ceramic is the refractory body:
1. coating (e g. by brushing or screening) a refractory surface (e.g. the ceramic's surface) with the composition of the present invention. The coating is then dried, either air dried at ambient conditions, or at elevated temperatures of about 120° C. to about 150° C. for about 10–20 minutes in order to accelerate drying;
2. applying a brazing filler metal in a preselected form (such as in the form of a wire, foil, strip, shim, ring, preform or powdered metal) to the refractory body (e g. ceramic body) and brazing at suitable substantially oxygen-free conditions (e.g. in vacuum, argon, or dry hydrogen atmosphere) at a temperature appropriate for the selected brazing filler metal.

The drying step (in 1, above) removes the fluid carrier, leaving a coating of the Group IVB transition metal component with the binder on the ceramic, thus facilitating later handling of the coated ceramic including joining the ceramic with another coated ceramic or metallic part. After applying the brazing filler metal material and undertaking the brazing step, the binder volatizes, removing the binder. The inclusion of the group IVB transition metal component, when applied by the method of the present invention, is believed to improve the strength of the braze joint.

DETAILED DESCRIPTION OF THE INVENTION

The present invention is directed to a coating composition than can be applied to a nonmetallic refractory material prior to brazing, the composition being comprised of (1) a group IVB transition metal component selected from the group consisting of a group IVB transition metal, a hydride of a group IVB transition metal, and mixtures of these group members, (2) a binder material, and (3) a fluid carrier. For example, the group IVB transition metal component may be selected from among titanium, zirconium, and hafnium, hydrides of these group IVB transition metals, and mixtures of these group members.

Suitable binder materials include, but are not limited to hydrocarbon resins, modified hydrocarbon synthetic resins, gum rosins, tall oil rosins, wood rosins, modified rosin, acrylic polymer, natural and synthetic waxes, synthetic rubber like polyisobutylene, thermoplastic mixture of polybutylene and paraffin, water or solvent soluble cellulosic polymers, water soluble resins such as acrylic acid polymers, polyolefin and linear primary alcohols. Also included is a gellant material like triblock, radial block and multiblock copolymers, optionally in conjunction with a diblock copolymer. In one embodiment, the binder includes a hydrocarbon resin. In yet another embodiment, the binder is hydrogenated hydrocarbon resin and styrene block copolymer.

A fluid carrier is also part of the composition. A non-exhaustive list of fluid carriers includes aliphatic hydrocarbon solvents, aromatic hydrocarbon solvents, alcohols, ketones, esters, glycol, glycol ether, glycerin, and water. The fluid carrier of choice will depend on its compatibility with the binder of choice. The composition may use both a paraffinic hydrocarbon fluid carrier and a hydro treated light petroleum distillate hydrocarbon fluid carrier.

In one embodiment, the composition includes about 10 to 90 weight percent of the group IVB transition metal component in a powder form, and about 90 to 10 percent binder and fluid carrier In another embodiment, the composition includes about 10 to 90 weight percent of titanium or titanium hydride metal powder, and about 90 to 10 percent binder and fluid carrier These compositions have the consistency suited for brushing, rolling, spraying or screening and stenciling the refractory surface.

As used herein, the term "binder" refers to a material or materials that, when present in the compositions of the invention, (1) facilitates the binding of the group IVB transition metal component to the refractory body, ferrous body, or non-ferrous body, or (2) helps maintain the group IVB transition metal component in a stable suspension within the fluid carrier, or (3) performs both of these functions.

After the composition is applied to the refractory surface, the fluid carrier is removed from the composition by air drying and/or heating so that a coating of the Group IVB transition metal component with the binder remain on the refractory surface. Subsequently, after the brazing filler metal is applied and brazing is undertaken, the binder volatizes at temperatures below the brazing temperature leaving little or no residue and, thus, does not interfere with or contaminate the braze joint.

Examples of suitable compositions for the present invention

The following chart shows examples of various coating compositions of the present invention. It is understood that these are merely exemplary of suitable materials that may be employed with the present invention.

| Ingredient | Trade Name | Weight % |
|---|---|---|
| 1. Active Metal- | | |
| Titanium powder, zirconium powder, hafnium, or any Group IVB elements, and hydrides of these elements. Mixtures of above | | 10 to 90% |

-continued

| Ingredient | Trade Name | Weight % |
|---|---|---|
| elements are also suitable. | | |
| 2. Binder- | | |
| Di or tri block copolymers based on thermo-plastic rubbers such as styrene block copolymers. | Available from the Penreco Division of Pennzoil | 1–50% |
| Modified hydrocarbon synthetic resins | Regalrez 1126 Resin | 1–10% |
| 3. Fluid carrier- | | |
| Isoparaffinic Hydrocarbon | Isopar G | 15–50% |
| Hydrogenated light distillate | Conosol 145 | 15–50% |

Active metals from the Group IVB including combinations of elements such as titanium and zirconium may be used to form a eutectic with a lower liquidus temperature or to meet other special requirements. The particle size of the group IVB transition metal powder can be a sufficient size to go through a 325 mesh screen (i.e., ~325) although other mesh sizes may be effective.

The type and/or amount of fluid carrier in the composition of the present invention is selected so as to adjust the viscosity of the composition. As shown in the chart above, one type of fluid carrier or a combination of two or more fluid carriers may be used in the composition of the present invention. For example, an isoparaffinic hydrocarbon may be used alone or combined with another fluid carrier such as hydrogenated light distillate fluid carrier. A plurality of the fluid carriers, including those disclosed in the chart, may be combined at any appropriate ratio so as to result in the desired viscosity and/or sufficient carrier properties of the composition.

In one embodiment, titanium or titanium hydride metal powder, having a mesh size of about ~325 is mixed with binder. A mixture may comprise about 35 weight percent titanium, 65 weight percent binder having hydrogenated hydrocarbon resins (Hercules) and/or styrene block copolymer, and treated light petroleum distillate hydrocarbon fluid carrier (Penreco). This mixture has a proper consistency for brushing, rolling or spraying the refractory surface.

The mixtures are coated on the refractory body in an amount sufficient to apply the group IVB transition metal in a percent range that is typically between about 2 percent and about 8 weight percent of the combined weight of the braze alloy and group IVB transition metal, with about 4 to 6 percent group IVB transition metal being well suited for this application.

For example, titanium or titanium hydride metal powder having a mesh size of about 325 mesh or smaller (44 micron or smaller) is mixed with the binder. The mixture may comprise about 65% weight titanium, 35% weight binder having hydrogenated hydrocarbon resins (Hercules) and styrene block copolymer, and treated petroleum distillate hydrocarbon fluid carrier (Penreco). This mixture has a consistency suitable for screening or stenciling for coating refractory body.

The present invention is used in conjunction with one or more brazing filler metals. The brazing filler metal may be a metal alloy that is being used to join a refractory material to, e.g. a metallic component or surface. Suitable brazing filler materials include, but are not limited to, conventional braze alloy such as a silver-copper eutectic composition (e.g. 72% silver and 28% copper), silver-copper alloys including from about 50 to 85 weight percent silver, and from about 15 to 50 weight percent copper, alloys of silver-copper-nickel, or silver-copper-indium (e.g. silver-copper-nickel alloys comprising from about 50 to 85 weight percent silver, from 15 to 50 weight percent copper and from about 0.2 to 2.5 weight percent nickel, while the silver-copper-indium alloys comprising from about 50 to 70 weight percent silver, from about 15 to 35 weight percent copper, and from about 10 to 20 weight percent indium), or the eutectic alloys of these metals.

A wide range of other conventional brazing filler alloys can be included when used for joining similar or dissimilar base materials or components. For example, alloys containing copper, nickel, tin, silver, gold, molybdenum, cobalt, or palladium, along with additives such as boron or the like. Other examples of brazing filler material include nickel base materials and gold-nickel alloys and semi-amorphous materials.

EXAMPLE ONE

A composition having an ink-like consistency has the following formulation. All percentages are by weight:
Titanium powder 35%
Binder:
(Regal Rez) 6.5%
Di- or tri-block copolymers based on thermoplastic rubbers such as styrene block copolymers in a hydrogenated light hydrocarbon distillate 16.25%
Fluid carrier (Isopar) 42.25%

EXAMPLE TWO

A composition with a paste-like consistency, suited for stenciling and screening, had the following formulation. All percentages are by weight
Titanium 55%
Isopar fluid carrier 5%
Binder
(Regal Rez) 19.4%
Di- or tri-block copolymers based on thermoplastic rubbers such as styrene block copolymers in a hydrogenated light hydrocarbon distillate 20.6%

The Regal Rez Is dissolved either directly into the fluid carrier, or into the di- or tri-block copolymers based on thermoplastic rubbers (such as styrene block copolymers) when supplied in a hydrogenated light hydrocarbon distillate carrier using any standard mixing process. Heat can be used to expedite the process, but is not necessary. The titanium is added to form a smooth, homogeneous mixture.

We claim:

1. A method of treating a non-metallic refractory material for brazing, comprising the steps of:
   coating a surface of the material with a coating composition comprising (i) a Group IVB transition metal component selected from the group consisting of a Group IVB transition metal, a Group IVB transition metal hydride, and mixtures thereof, (ii) a binder including a hydrocarbon resin and styrene block copolymer, and (iii) a fluid carrier;
   drying the coated surface;
   applying a brazing filler material in a selected form on the dried coated surface; and
   heating the brazing filler material to a temperature above a liquidus of said material in a substantially oxygen free environment.

2. The method of claim 1, wherein the drying step is carried out at ambient conditions.

3. The method of claim 1, wherein the drying step is carried out at elevated temperatures of about 120 to about 150 degrees C. for between 10 and 20 minutes.

4. The method of claim 1, including selecting the brazing filler material in the form of a wire, a foil, a strip, a shim, a ring, a preform or a powdered metal.

5. The method of claim 1, wherein the heating step is carried out in a vacuum, or in argon or dry hydrogen.

6. The method of claim 1, including providing titanium, zirconium, hafnium, or mixtures thereof as the group IVB transition metal component of the coating composition.

7. The method of claim 1, including formulating the coating composition from between about 10 and about 90 weight percent of the transition metal component and between about 90 and about 10 weight percent of the binder and the fluid carrier combined.

8. The method of claim 1, including providing one or more of aliphatic hydrocarbon solvents, aromatic hydrocarbon solvents, alcohols, ketones, esters, glycol, glycol ether, glycerin, water, paraffinic hydrocarbon solvents, and hydro treated light petroleum distillate hydrocarbon solvents, as the fluid carrier of the coating composition.

9. The method of claim 1, wherein the coating step is carried out by brushing, spraying or rolling though a masking stencil.

10. The method of claim 1, including providing the group IVB transition metal component of the coating composition in an amount that is between about 2 weight percent to about 8 weight percent of a combined weight of the group IVB transition metal component and the braze filler material applied to the surface of the refractory material.

11. The method of claim 1, including providing the transition metal component of the coating composition in an amount that is between about 4 weight percent to about 6 weight percent of a combined weight of the transition metal component and the braze filler material applied to the surface of the refractory material.

12. The method of claim 1, including formulating the coating composition from about 35 weight percent of the transition metal component and about 65 weight percent of the binder and the fluid carrier combined.

13. The method of claim 1, including formulating the coating composition from about 65 weight percent of the transition metal component and about 35 weight percent of the binder and the fluid carrier combined.

14. The method of claim 1, wherein the coating step is carried out by brushing, rolling or spraying the surface of the refractory material.

15. The method of claim 1, wherein the coating step is carried out by screening or stenciling the surface of the refractory material.

16. The method of claim 1, including formulating the fluid carrier from both a paraffinic hydrocarbon and a hydro treated light petroleum distillate.

17. The method of claim 1, including adjusting the viscosity of the coating composition by varying a weight percentage of the fluid carrier in the composition.

* * * * *

UNITED STATES PATENT AND TRADEMARK OFFICE
CERTIFICATE OF CORRECTION

PATENT NO. : 6,840,429 B2
DATED : January 11, 2005
INVENTOR(S) : Lawrence A. Wolfgram and Nitin R. Shah It is certified that error appears in the above-identified patent and that said Letters Patent is hereby corrected as shown below:

Title page,
Item [57], ABSTRACT,
Line 11, change "carrier, disclosed" to -- carrier. In disclosed --.

Column 2,
Line 62, change "example, In" to -- example, in --.

Column 4,
Line 41, after "functions." insert the following:
   -- As used herein, the term "fluid carrier" refers to a fluid material that serves as a carrying agent for the group IVB transition metal component and the binder. The fluid carrier is volatizable at temperatures lower than the temperatures at which brazing or soldering will be effected. In some instances, the carrier may be a solvent for at least one of the group IVB transition metal component and the binder.
   Binders include, but are not limited to, hydrogenated hydrocarbon resins (available from Hercules under the trade name Regal Rez), di-and tri-block copolymers based on thermoplastic rubbers, such as styrene block copolymers (available from Penreco). Other suitable fluid carriers include, but are not limited to, isoparaffinic hydrocarbons available under the Isopar tradename from Exxon and hydrogenated light distillates available under the Conosol trandename from Penreco.
   In another example, Versagel and Synergel, available from Penreco, are suited for use in the compositions of the present invention. --.

Column 5,
Line 61, before "refractory" insert -- a --.

Column 6,
Line 19, after "rials." insert the following:
   -- The brazing filler material used with the present invention can be of any suitable shape and form. For example, the brazing filler material can be in the form of wire, foil, strip, shim, ring, preform or powdered metal.

UNITED STATES PATENT AND TRADEMARK OFFICE
CERTIFICATE OF CORRECTION

PATENT NO. : 6,840,429 B2
DATED : January 11, 2005
INVENTOR(S) : Lawrence A. Wolfgram and Nitin R. Shah It is certified that error appears in the above-identified patent and that said Letters Patent is hereby corrected as shown below:

<u>Column 6 (cont'd),</u>
　　The composition of the present invention is suited for use with oxide ceramics like alumina, zirconia, silica, etc. In addition, most nitrides, carbides, diamonds (synthetic or natural), graphite or carbon, and sapphire (or similar gemstones) can be joined without the need for prior metallizing procedures. --.

Signed and Sealed this

Sixth Day of June, 2006

JON W. DUDAS
*Director of the United States Patent and Trademark Office*